US005564002A

United States Patent [19]

Brown

[11] Patent Number: 5,564,002

[45] Date of Patent: Oct. 8, 1996

[54] METHOD AND APPARATUS FOR IMPLEMENTING A VIRTUAL DESKTOP THROUGH WINDOW POSITIONING

[75] Inventor: Kurt R. Brown, Lexington, Ky.

[73] Assignee: International Business Machines Corporation, Armonk, N.Y.

[21] Appl. No.: 284,013

[22] Filed: Aug. 1, 1994

[51] Int. Cl.$^6$ .......... G06F 3/14

[52] U.S. Cl. .......... 395/155; 395/157

[58] Field of Search .......... 395/155, 157, 395/159, 160, 161, 500, 600, 375, 163; 364/578

[56] References Cited

U.S. PATENT DOCUMENTS

| | | | |
|---|---|---|---|
| 4,845,644 | 7/1989 | Anthias et al. | 364/521 |
| 5,155,836 | 10/1992 | Jordan et al. | 395/500 |
| 5,157,783 | 10/1992 | Anderson et al. | 395/600 |
| 5,218,607 | 6/1993 | Saito et al. | 371/66 |
| 5,233,687 | 8/1993 | Henderson, Jr. et al | 395/158 |
| 5,241,625 | 8/1993 | Epard et al. | 395/163 |
| 5,241,680 | 8/1993 | Cole et al. | 395/750 |
| 5,255,211 | 10/1993 | Redmond | 364/578 |
| 5,442,759 | 8/1995 | Chiang et al. | 395/375 |

*Primary Examiner*—Mark R. Powell
*Assistant Examiner*—Ruay Lian Ho
*Attorney, Agent, or Firm*—Bruce D. Jobse; Mark S. Walker

[57] ABSTRACT

A novel virtual desktop system organizes open applications of a computer into groups of programs that perform common functions or tasks. The groups of programs are called Desktops and the virtual desktop system provides a Desktop Manager for assigning ranges of display screen coordinates to these Desktops, and then assigning open applications to them. Specifically, the Desktop Manager is a system software program that contains a plurality of Desktop groups and that provides a user interface for managing the display of selected open applications assigned to the Desktops. These selected open applications are displayed in application windows on a display screen of the computer when switching between Desktops in the virtual desktop system.

18 Claims, 10 Drawing Sheets

METHOD AND APPARATUS FOR IMPLEMENTING A VIRTUAL DESKTOP THROUGH WINDOW POSITIONING

FIELD OF THE INVENTION

This invention relates generally to computer systems and, more specifically, to a virtual desktop system of an improved window environment for a computer system.

BACKGROUND OF THE INVENTION

A window environment is system software that manages interactions between a user and an application program executing on a computer through a graphical display portrayed on a screen of a monitor. Typically, the graphical display is arranged to resemble the surface of an electronic "desktop" and each application program running on the computer is represented as one or more electronic paper sheets displayed in rectangular regions of the screen called "windows".

There may be several windows simultaneously present on the desktop with each window displaying information that is generated by a different application program. Each application program presents information to the user through its window by drawing images, graphics or text within the window region. The user, in turn, communicates with the application by "pointing at" standard graphical objects in the window with a pointer that is controlled by a pointing device, such as a mouse, and then selecting the objects, or by typing information into a keyboard associated with the monitor. Selection of the objects may effected by actuating the mouse to move the pointer onto or near the objects and pressing and quickly releasing, i.e., "clicking", a button on the mouse, or by manipulating a cursor via the keyboard.

The graphical objects typically included with each window region are sizing boxes, buttons and scroll bars. These objects represent user interface elements that the user can point at with the pointer to select or manipulate. For example, the user may manipulate these elements to move the windows around on the display screen, and change their sizes and appearances so as to arrange the desktop in a convenient manner. When the elements are selected or manipulated, the underlying application program is informed, via the window environment, that control has been appropriated by the user.

Pop-up and pull-down menus are further examples of user interface elements that list command selections that are generally available to a user. These menus can be activated and commands selected merely by pointing to them and clicking on them with the mouse-controlled pointer.

There are a number of different window environments commercially available which utilize the arrangement described above. These environments include the System 7® operating system developed by Apple Computer, Inc., the Windows® graphical user interface developed by the Microsoft Corporation and the OS/2 Presentation Manager® developed by International Business Machines Corporation. The present invention is applicable to all such environments and is concerned with managing applications using a desktop metaphor for grouping the applications by related functions or tasks.

In general, the desktop metaphor facilitates user efficiency by presenting an environment within which the user can easily manage those applications required to perform work. The window environments described above typically provide only a single desktop that organizes applications into predefined "groups" of applications, each of which are related by function. Each of these applications are represented by a small picture called an "icon". Although the user can arrange, create and delete the icons and their associated groups displayed on the desktop, the associated applications are not running or "opened"; that is, the window environments described above typically do not allow grouping of opened applications.

Applications may be opened by selecting their associated icons from a predefined group and these open applications typically run in "application windows" that are visible on the desktop. When more than one application is opened simultaneously, the desktop may assume a cluttered appearance. In order to free space on the desktop without quitting the applications, the open application windows can be minimized to appear as icons which are generally the same icons as the icons used to represent the unopened application. Although an opened application program is represented by an icon, that icon is no longer part of the predefined group and appears on the desktop along with other icons representing opened applications from other groups.

Therefore, it is among the objects of the present invention to provide grouping of related open applications in an arrangement that visually separates groups of related applications.

SUMMARY OF THE INVENTION

The invention resides in a novel virtual desktop system for organizing "open" applications of a computer into groups of programs that perform common functions or tasks. The groups of programs are called "Desktops" and the virtual desktop system provides a Desktop Manager for assigning ranges of display screen coordinates to these Desktops prior to assigning open applications to them. Specifically, the Desktop Manager is a system software program that contains a plurality of Desktop groups and that provides a user interface for creating and thereafter managing the display of selected open applications and Desktops. These selected open applications are displayed in application windows on a display screen of the computer when switching between Desktops in the virtual desktop system.

According to an aspect of the present invention, an arrangement is provided by which the Desktop Manager assigns ranges of display screen coordinates to each Desktop and then positions application windows within these ranges for assignment to those Desktops. In the illustrative embodiment described herein, the virtual desktop system allows application windows to be positioned at display screen coordinates ranging from, e.g., minus 16,767 to 16,768 window units; however, only a subset of that range defining a current view is visible on the screen at any one time.

In order to display the applications assigned to a selected Desktop, a Desktop view that is currently displayed on the screen is switched to the coordinates assigned to the selected Desktop. Switching between the Desktops is preferably accomplished in connection with the Desktop Manager and a conventional window application programming interface. Application windows that are not assigned to the selected Desktop are not visible since they are positioned out of the displayed field of view, the screen coordinates of which are preferably fixed.

In many systems, the width of a display screen in window units may change with video resolution and applications belonging to one Desktop may "over-hang" onto another Desktop, thereby shifting applications not intended for display on the screen into the visible area of the screen. Accordingly, the range of window units assigned to each Desktop is preferably at least twice the maximum width of the screen. Increasing the coordinate range of each Desktop ensures that application windows not assigned to a currently displayed Desktop are not visible on the screen.

According to another aspect of the invention, each Desktop includes a data structure for storing a list of all its open applications along with the sizes and window positions of those applications. The list is used to compare each application window's position with the coordinate range assigned to the Desktop so that the Desktop may determine whether the window belongs to it; this is significant to enable application sharing. Sharing of applications among Desktops may be required because some applications allow only one copy of themselves to be executed at a particular time. As described herein, the Desktop Manager is responsible for coordinating application sharing.

In accordance with yet another aspect of the invention, the Desktop Manager also contains a data structure for storing a list of all Desktops by name/function and display screen coordinate range. The contents of this data structure are used by the Desktop Manager to determine which applications are assigned to the Desktops; such information may be useful when resolving a conflict concerning application sharing and when exiting the virtual desktop system.

For example, application sharing may be appropriate when a window becomes "active" outside the current field of view, indicating that another Desktop contains the active application. The Desktop Manager watches for this occurance and, if the application can be borrowed, initiates application sharing in an appropriate manner, e.g., brings the active application into the current field of view. If the application cannot be borrowed between Desktops, the Desktop Manager informs the user that the active application cannot be shown. Thereafter, when the user exits the virtual desktop environment, the Desktop Manager sends messages to the Desktops requesting them to show their assigned applications. This ensures that open applications do not remain hidden when exiting the Desktop Manager program.

BRIEF DESCRIPTION OF THE DRAWINGS

The above and further advantages of the invention may be better understood by referring to the following description in conjunction with the accompanying drawings, in which.

DESCRIPTION OF THE PREFERRED EMBODIMENT(S)

Figure 1:
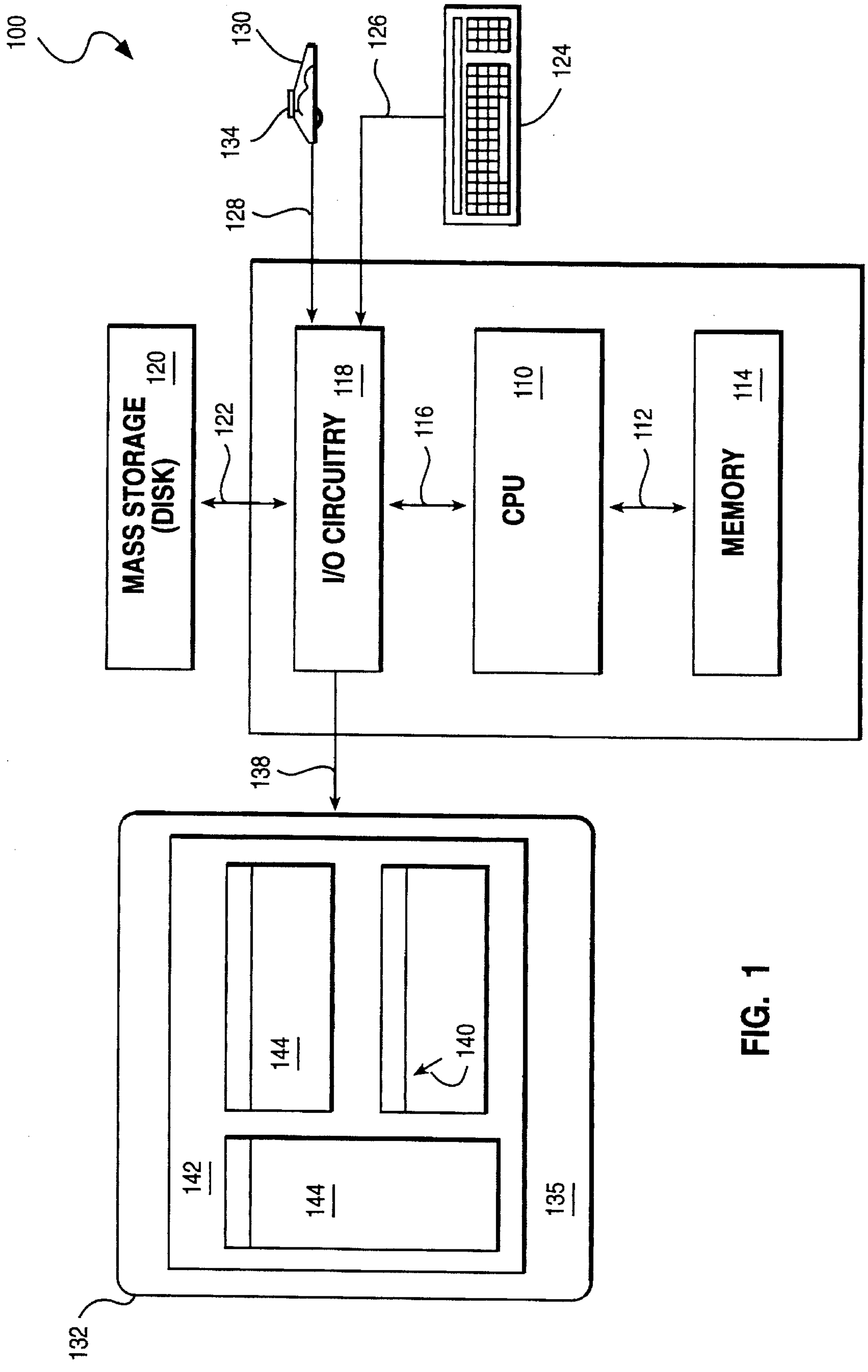
FIG. 1 is a schematic block diagram of a computer system, such as a personal computer system, on which an inventive virtual desktop system may advantageously operate.

FIG. 1 is a schematic illustration of computer system 100 comprising a central processing unit (CPU) 110 coupled between a memory 114 and input/output (I/O) circuitry 118 by bidirectional buses 112 and 116. The memory 114 typically comprises random access memory (RAM) for temporary storage of information, including an application program, and read only memory (ROM) for permanent storage of the computer's configuration and basic operating commands, such as portions of an operating system. As described further herein, the application program and operating system interact to control the operations of the CPU 110 and computer system 100.

The I/O circuitry 118 is, in turn, connected to a communications network 120, such as a telephone line, via a bidirectional bus 122, and to cursor control devices, such as a keyboard 124 (via cable 126) and a mouse 130 (via cable 128). The mouse 130 typically contains at least one button 134 operated by a user of the system. A conventional display monitor 132 having a display screen 135 is also connected to I/O circuitry 118 via a cable 138. A pointer (or cursor) 140 is displayed on the screen 135 and its position is controllable via the mouse 130 or the keyboard 124, as is well known.

Specifically, the I/O circuitry 118 receives information, such as control and data signals, from the mouse 130 and keyboard 124, and provides that information to the CPU 110 for transmission over the network 120 or for display on the screen 135. It is to be understood that the I/O circuitry contains the necessary hardware and software, e.g., buffers, adapters and protocols, needed to interface with the network, mouse, keyboard and display monitor.

The computer system 100 is preferably a personal computer of the IBM PS/1® series of computers sold by International Business Machines Corporation, although the invention may also be practiced in the context of any computer. These computers have resident thereon, and are controlled and coordinated by, operating system software, such as the IBM® OS/2® operating system. In addition, a window environment, such as the Windows® graphical user interface, is preferably displayed on the screen 135 as a graphical display to facilitate interactions between a user and the computer 100. The graphical display is typically arranged to resemble a single desktop 142 and each application program executes in an application window 144 of the screen 135. Typically, there may be several other windows 144 simultaneously present on the desktop with each window displaying information that is generated by a different application.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the windows 144 for presentation to the user.

As noted, the window environment typically organizes application icons into predefined groups of applications, yet it does not allow grouping of open application icons by related function or task. That is, once an application is executing, its window (or its icon, if minimized) is no longer part of the predefined group. The present invention, however, features the provision of additional utility programs which, when invoked, cause actions to take place that enable a user to organize open applications into groups related by functions or tasks. This new behavior of the system is brought about by the interaction of these new utility routines with a series of existing system routines associated with the operating system. Together, these system software routines interact with the application program to create a novel virtual desktop system, as described herein.

Figure 2:
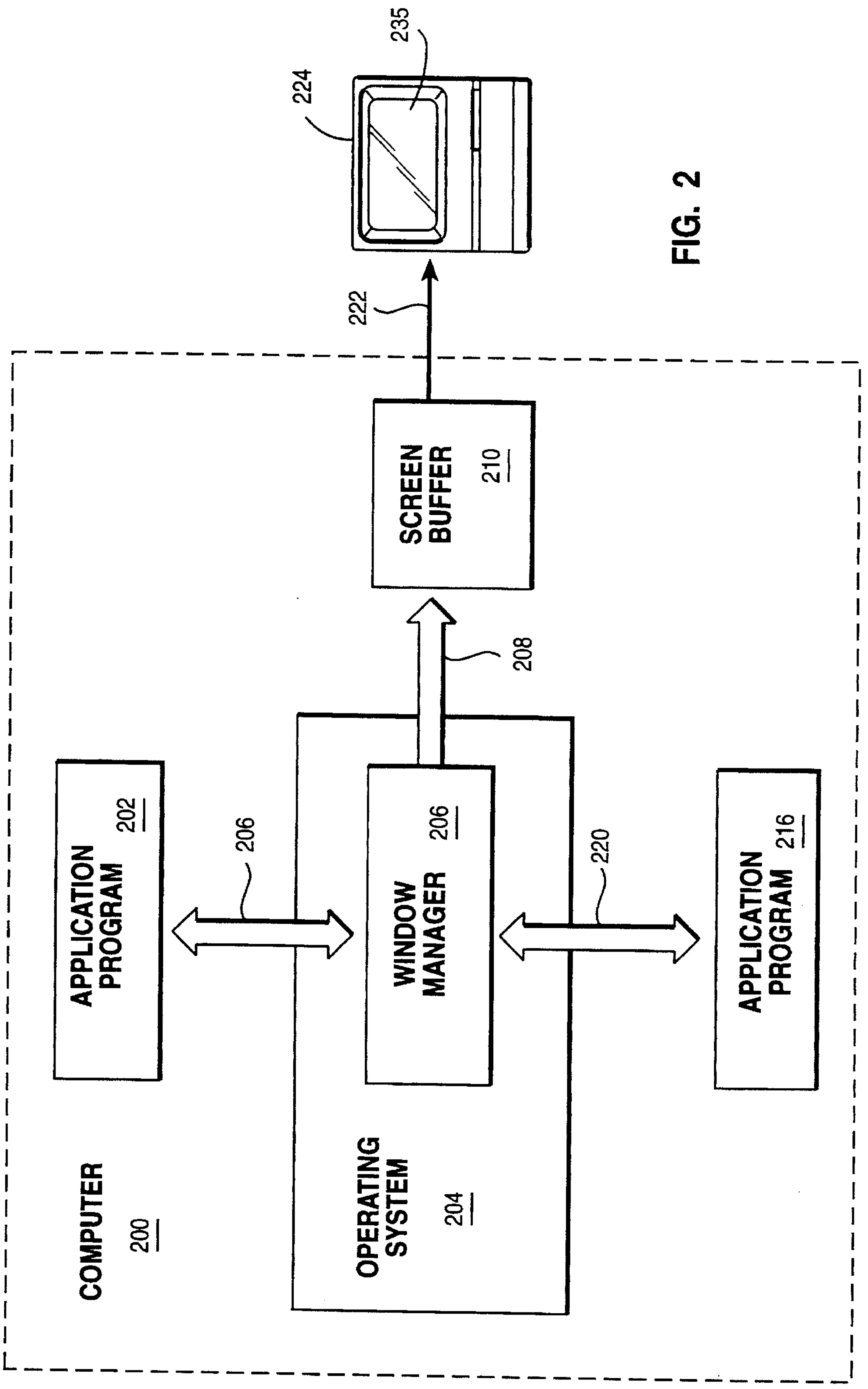
FIG. 2 is a block diagram showing the interactions between a plurality of application programs and the virtual desktop system in accordance with the invention.

FIG. 2 is a schematic illustration of the interaction of a plurality of application programs, shown at 202 and 216, and the virtual desktop system 300. The system 300 is located in an operating system 204 which may be executing simultaneously with the application programs on a computer system 200. Each program 202 and 216 interfaces with the operating system 204 as illustrated schematically by arrows 206 and 220. In order to display information on a computer screen, application programs 202 and 216 generate and send display requests to the virtual desktop system 300 which, in turn, interfaces directly with a screen buffer 210 as illustrated schematically by arrow 208. The contents of screen buffer 210 are provided to a computer monitor 224 over cable 222.

Figure 3:
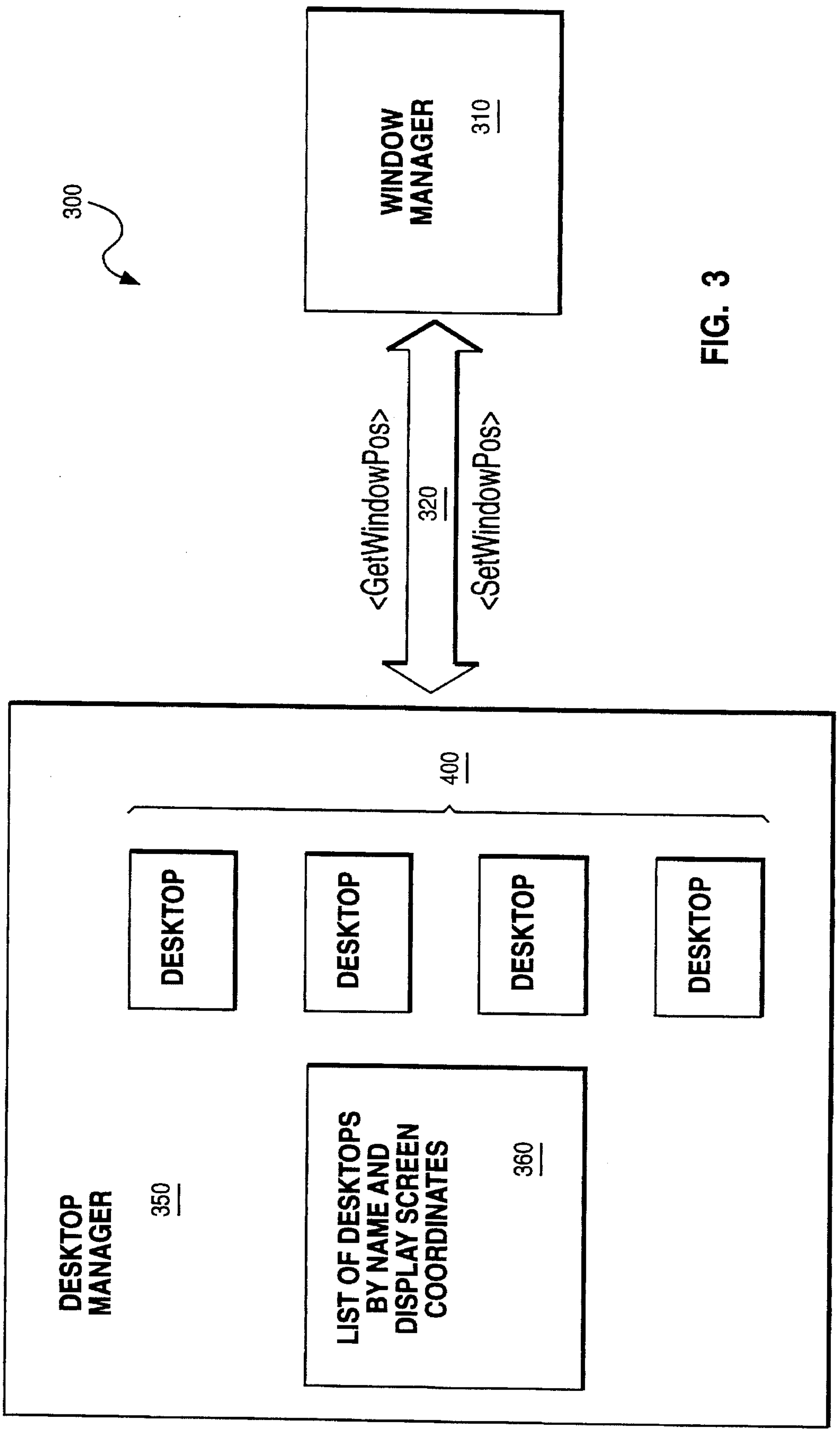
FIG. 3 is a block diagram of the virtual desktop system of FIG. 2 including a novel Desktop Manager program in accordance with the invention.

In accordance with the invention, the novel virtual desktop system 300 provides a means for organizing "open" applications running on the display screen 135 into Desktop groups that are related by common functions. These Desktop groups manifest as Desktop display areas on the computer screen. FIG. 3 is a block diagram of the virtual desktop system 300 comprising a window manager 310 and a novel Desktop Manager 350. Interaction between the window manager 310 and Desktop Manager 350 is achieved, in part, using function calls of a conventional Windows® application programming interface (API), as illustrated schematically by arrow 320.

Specifically, the window manager 310 is a system software routine that is generally responsible for managing the windows that a user views during operation of the application programs of the computer. That is, it is generally the task of the window manager to keep track of the location and size of the window and window areas which must be drawn and redrawn in connection with novel virtual desktop system. To this end, the window manager 310 communicates with all application programs and coordinates between the applications to ensure that window displays do not interfere with each other. The window manager is generally well-known and is incorporated in commercially available window environments.

The Desktop Manager 350 is also a system software program comprising a plurality of Desktop program groups 400. As described herein, the Desktop Manager assigns a range of non-overlapping display screen coordinates to each Desktop 400 and then assigns open applications to these Desktops 400 by application window position. Assignment of Desktop ranges and open applications is preferably accomplished in connection with a data structure 360 associated with the manager 350. This data structure 360 is preferably a list of the name/function and display screen coordinates of all Desktops 400 contained within the Desktop Manager 350. In the illustrative embodiment of the invention, there are preferably four (4) Desktops contained in the Desktop Manager 350 of the virtual desktop system 300; however, it will be apparent to those skilled in the art that any number of Desktops may be supported by the Desktop Manager 350 in accordance with the principles of the invention.

The Desktop Manager 350 also provides an interface for a user to manage the display of selected of these open applications in application windows 144 on the display screen 135. This Desktop Manager interface is generally similar to the user interface provided by the Program Manager utility program of the Windows® graphical user interface. This feature of the invention also allows a user to create and display any of the plurality of Desktop groups 400, each of which comprises a collection of open applications related by function or task.

Figure 4:
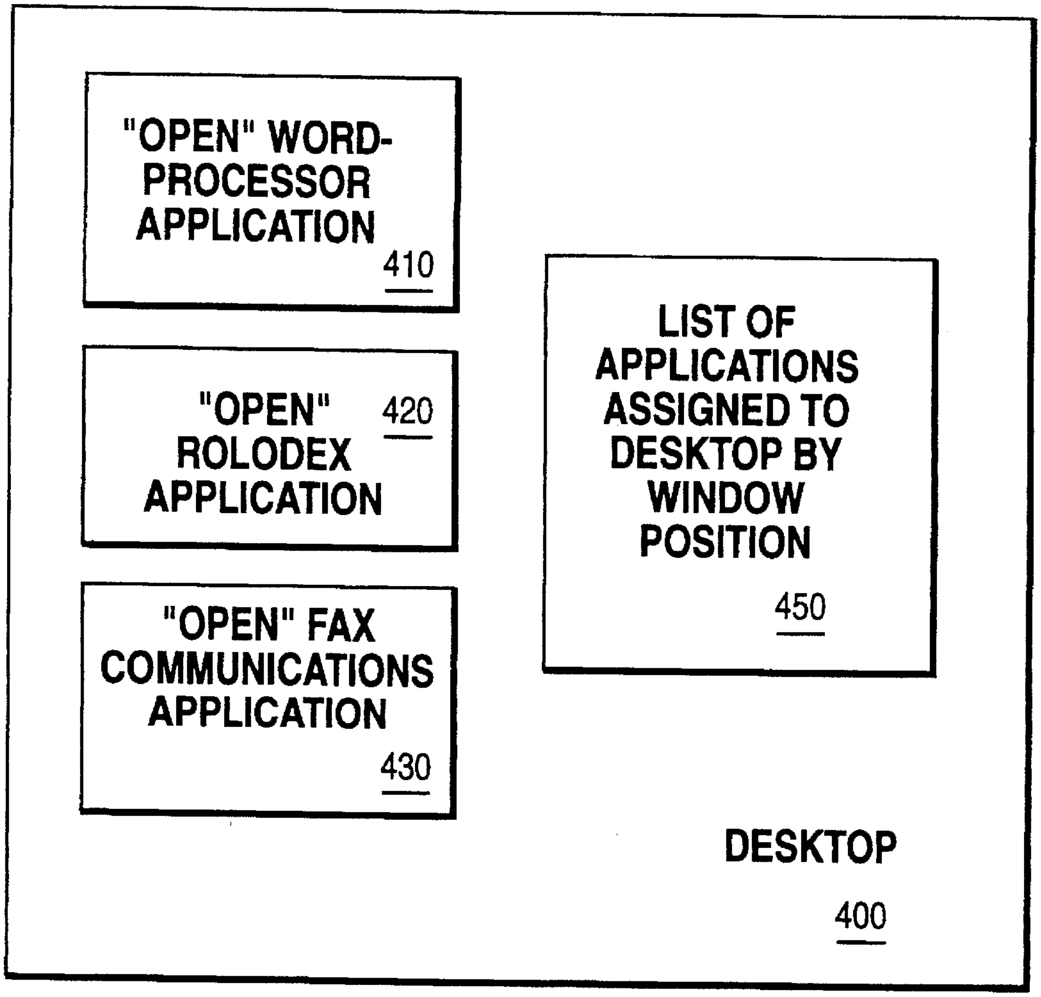
FIG. 4 is a block diagram of a novel Desktop program of related open applications that is associated with the Desktop Manager of FIG. 3.

For example, the user may create a fax sending/receiving Desktop 400 that comprises software needed to compose and send a fax document from the computer of FIG. 1 to a destination over the network 120. FIG. 4 illustrates such a "fax" Desktop 400 comprising a word processor application program 410, a rolodex-type application program 420 and a fax communications program 430. Here, the word processor program 440 enables the user to construct a textual document intended for a destination having an address identified by the rolodex program 420. The communications program 430 then initiates transmission of the document to that address over the network.

In general, a Desktop may be created by a user by retrieving a pull-down or pop-up menu from the user interface provided by the Desktop Manager 350. The pull-down and pop-up menus are user interface elements that provide a list of command selections for, inter alia, creating and selecting Desktop groups, and for exiting the virtual desktop system. Applications may be thereafter added to a Desktop by, e.g., opening application windows on that Desktop or by "dragging and dropping" application icons onto a Desktop, which may also be represented by an icon on the Desktop Manager screen, with the mouse 130. A pop-up or "child" window that may be created by an application window in a Desktop automatically positions itself relative to its parent window and becomes assigned to that Desktop.

The Desktop 400 also includes a data structure 450 for storing a list of all open applications assigned to that Desktop, together with the sizes and window positions of those applications' windows. This list may be useful when comparing an application window's position with the range of window position coordinates assigned to the Desktop so that the Desktop may determine whether a particular application window belongs to it.

Specifically, each Desktop 400 is assigned a range of display screen coordinates by the Desktop Manager 350, which then positions selected application windows within these ranges for assignment to that Desktop. The virtual desktop system 300, including the window manager 310, supports the positioning of application windows at display screen coordinates ranging from, e.g., minus 16,767 to 16,768 window units. Typically, only a subset of that range, called a current view, is visible on the screen. In the illustrative embodiment of the invention, the maximum width of video resolution of the display screen 135 is preferably 640 window units; accordingly, the current view preferably comprises a range of 0 to 640 window units. However, this resolution may change among display screens, thereby causing applications intended for display on the screens to be shifted outside of their visible areas.

In general, the Desktop Manager 350 obtains the resolution of the display screen by issuing function calls associated with the conventional API. For example, the Desktop Manager may issue a <GetSysMetrics> function call message to the window manager 310 to acquire the video resolution of the display screen. In response to this function call, the window manager returns the requested information and the Desktop Manager assigns a range of window units to each Desktop that is preferably at least twice the maximum width of the screen.

Figure 5:
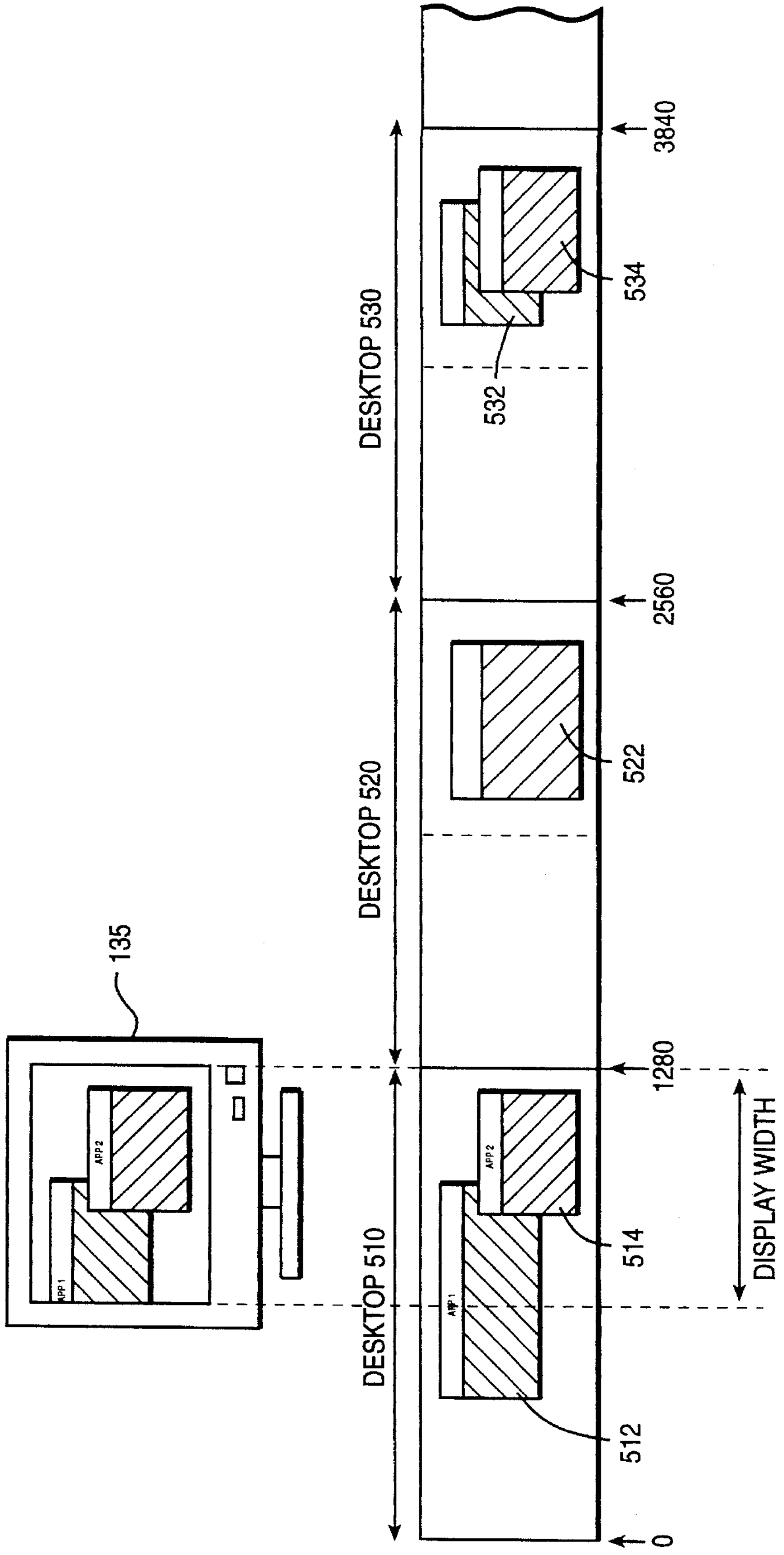
FIG. 5 is a schematic diagram illustrating the assignment of display screen coordinates and associated window positions of open applications for the Desktop programs having widths equal to twice the width of a computer display screen of FIG. 1.

FIG. 5 shows the widths of Desktop display areas 510–530 being twice the width of a display screen. Each Desktop is preferably assigned a range of display screen coordinates of 1280 window units and the open applications of each Desktop are assigned window positions within these ranges. Increasing the coordinate range of each Desktop thus ensures that application windows not assigned to a currently displayed Desktop are not visible on the screen.

Specifically, Desktop 510 is assigned display screen coordinates 0–1280, Desktop 520 is assigned coordinates 1280–2560 and Desktop 530 is assigned coordinates 2560–3840. These coordinate ranges are stored in the data structure 360 of the Desktop Manager 350 by name and function of the Desktop. As noted, the Desktop Manager 350 also assigns open application windows to each Desktop by window position using the conventional API; additional function calls associated with this interface are described below in connection with FIGS. 6 and 8–10. More specifically, the Desktop Manager communicates with the window manager by exchanging function call messages that position the application windows 512 and 514 within Desktop 510, the application window 522 within Desktop 520 and the application windows 532 and 534 within Desktop 530. Thereafter, the window positions of all open application windows are stored in the data structure 450.

Figure 6:
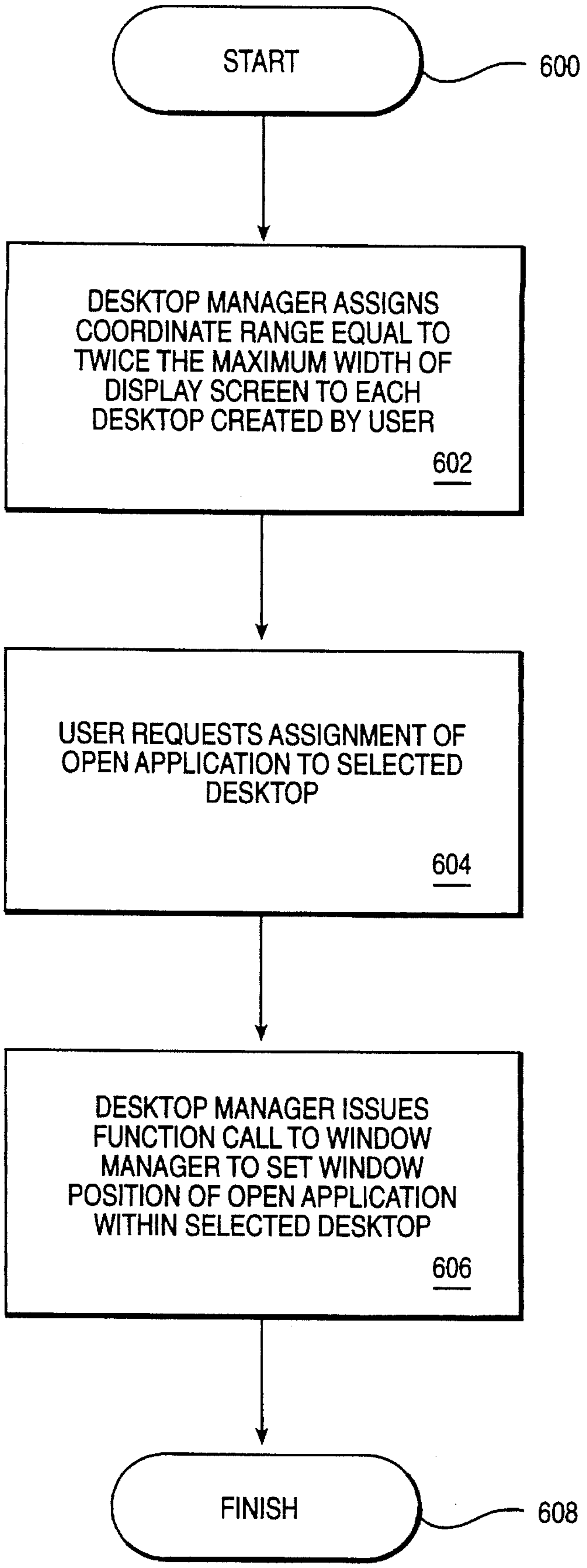
FIG. 6 is a flowchart illustrating the sequence of steps for assigning display screen coordinates and window positions to the Desktops and their associated application windows of FIG. 5.

FIG. 6 is a flowchart illustrating the sequence of steps for assigning display screen coordinates and window positions to the Desktops and their associated application windows. The routine starts in Step 600 and proceeds to Step 602 where the Desktop Manager assigns display screen coordinate regions to each Desktop created by the user. As noted, each Desktop is preferably assigned a range of display screen coordinates equal to twice the maximum width of the screen or, in the illustrative embodiment, 1280 window units. In Step 604, the user issues a command to the Desktop Manager requesting it to assign an application to a selected Desktop. In response to the request, the Desktop Manager, in Step 606, issues a <SetWindowPos> function call message to the window manager 310 to set the window position of the application within the selected Desktop and the routine finishes in Step 608.

Figure 7:
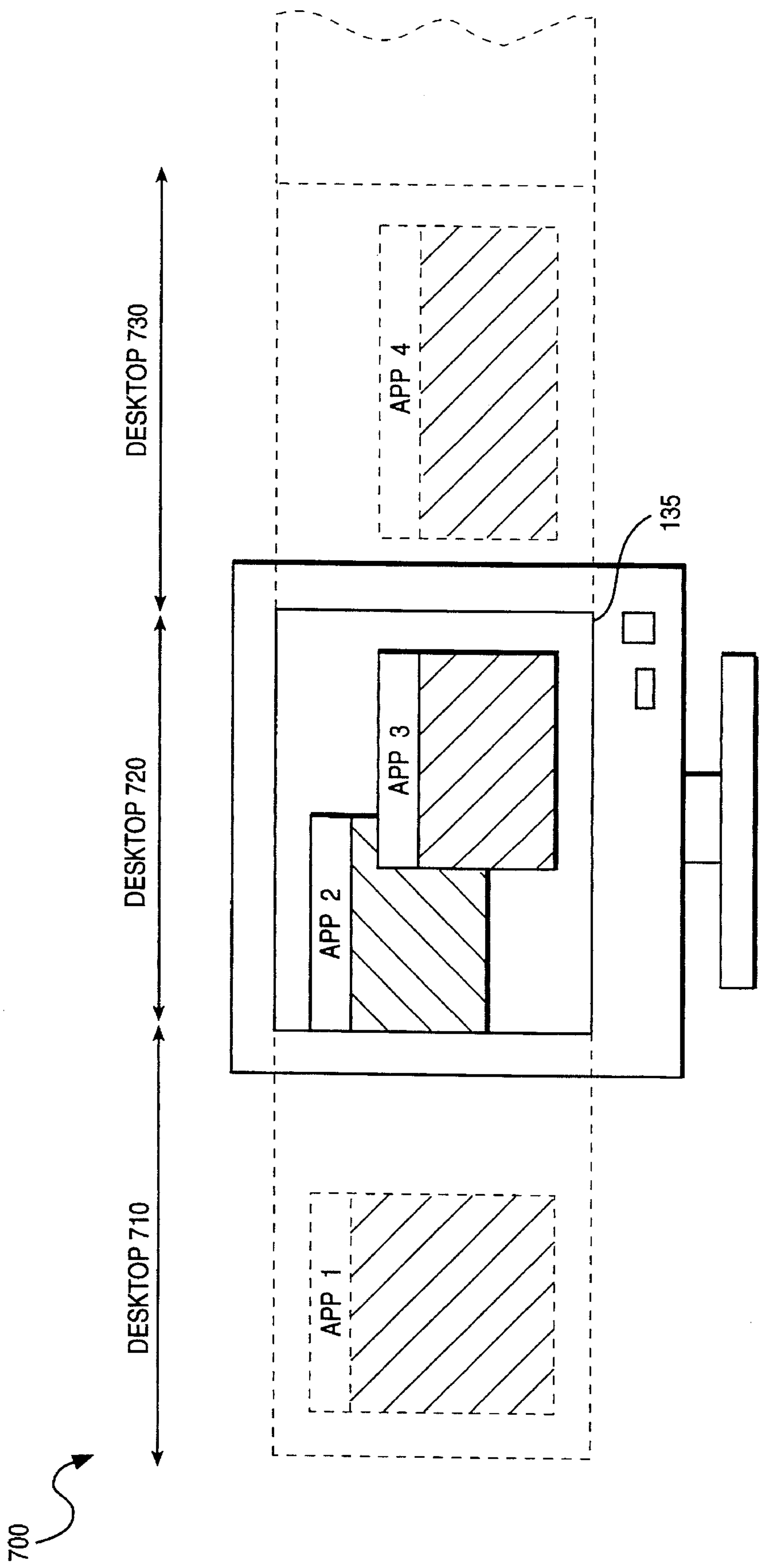
FIG. 7 illustrates an embodiment of the virtual desktop system in accordance with the invention.
Figure 8:
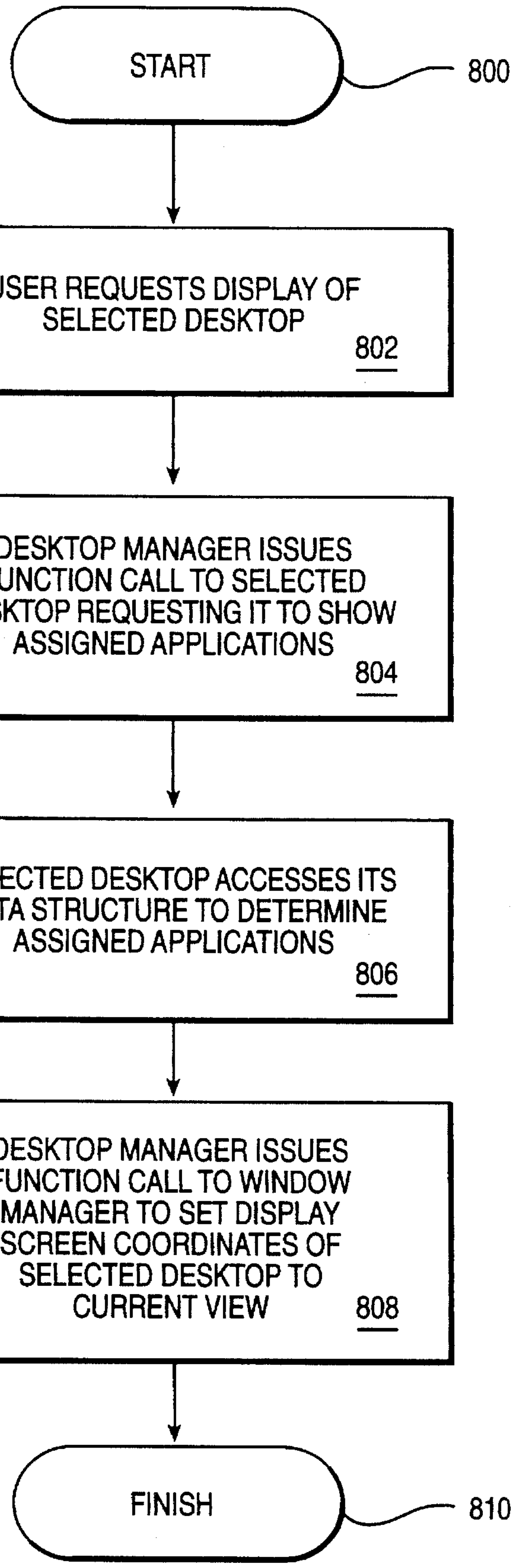
FIG. 8 is a flowchart illustrating switching between Desktops in accordance with the embodiment of FIG. 7.

In order to display the open applications assigned to a selected Desktop, a Desktop view that is currently displayed on the screen is shifted, i.e., switched, to the coordinates assigned to the selected Desktop. FIG. 7 illustrates an embodiment of the virtual desktop system 700 with Desktop 720 occupying the current view displayed on the screen 135. As noted, the currently displayed field of view has a fixed screen coordinate range of 640 window units. Application windows that are not assigned to the Desktop selected for the current view are not visible since they are positioned out of the displayed field of view. Switching between the Desktops is preferably accomplished using the conventional API as described in the following flowchart of FIG. 8.

Here, the switching routine starts in Step 800 and proceeds to Step 802 where the user issues a command to the Desktop Manager requesting display of a selected Desktop not currently in the field of view. The user's request is typically invoked via the pull-down or pop-up menus described above. In Step 804, the Desktop Manager issues a <ShowView> function call message to the selected Desktop, requesting that the Desktop show its assigned applications by window position. The selected Desktop then accesses its data structure to determine which application windows, including the sizes and positions of those windows, are assigned to it, as illustrated in Step 806, and returns this information to the Desktop Manager. In Step 808, the Desktop Manager issues a <SetWindowPos> function call message to the window manager to set the display screen coordinates of the selected Desktop to the current view in accordance with the obtained information. This is preferably accomplished by moving each application window to the current view. The routine finishes in Step 810.

Figure 9:
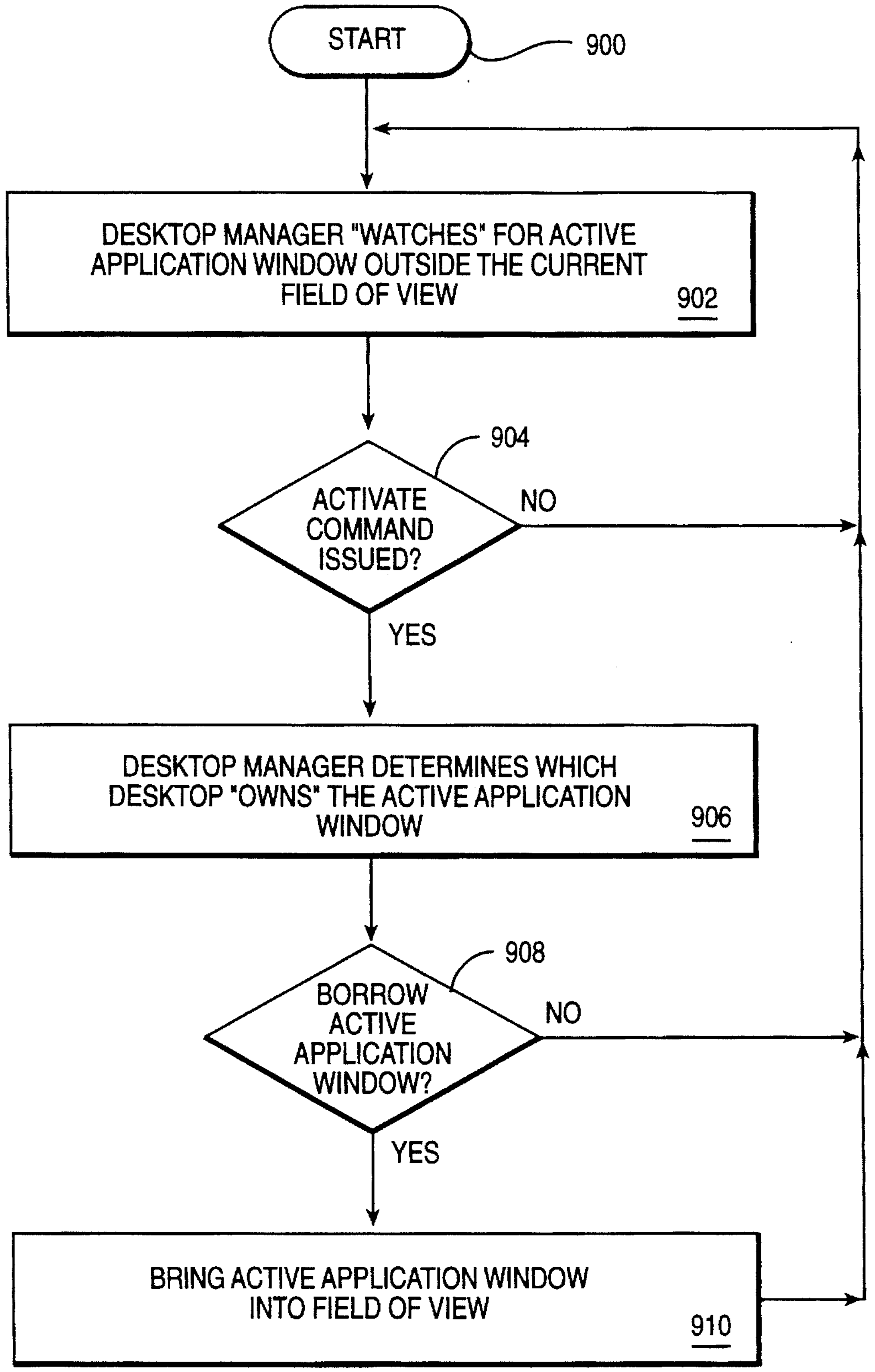
FIG. 9 is a flowchart illustrating sharing of applications in accordance with the invention.

As noted, the Desktop Manager 350 is responsible for coordinating sharing of applications between Desktops when only one copy of an application can be executed at a time. Application sharing may be appropriate when a window becomes "active" outside the current field of view, indicating that another Desktop contains the active application. The process of coordinating such sharing of applications is shown in the flowchart of FIG. 9.

The routine starts in Step 900 and proceeds to step 902 where the Desktop Manager "watches" for a window to become active outside the current field of view. Specifically, the Desktop Manager monitors messages between the window manager and application programs looking for an ACTIVATE command in Step 904. In response to issuance of the ACTIVATE command, the Desktop Manager determines which Desktop "owns" the active application, as illustrated in Step 906, by issuing a function call message <ShowView> to the Desktops. In Step 908, the Desktop Manager determines whether the active application can be borrowed between the Desktops by prompting the user via, e.g., a dialog box, as to whether the application can be borrowed. If the application cannot be borrowed because, e.g., it is locked or password-protected, the routine merely repeats back to Step 902. However, if the user allows borrowing of the application, the Desktop Manager initiates application sharing in an appropriate manner, e.g., by bringing the active application into the current field of view as shown in Step 910; this is achieved by issuing a <SetWindowPos> function call from the Desktop Manager to the window manager. Thereafter, the routine repeats back to Step 902. Of course, the routine will terminate when the virtual desktop system is exited or if the computer system is turned off.

Figure 10:
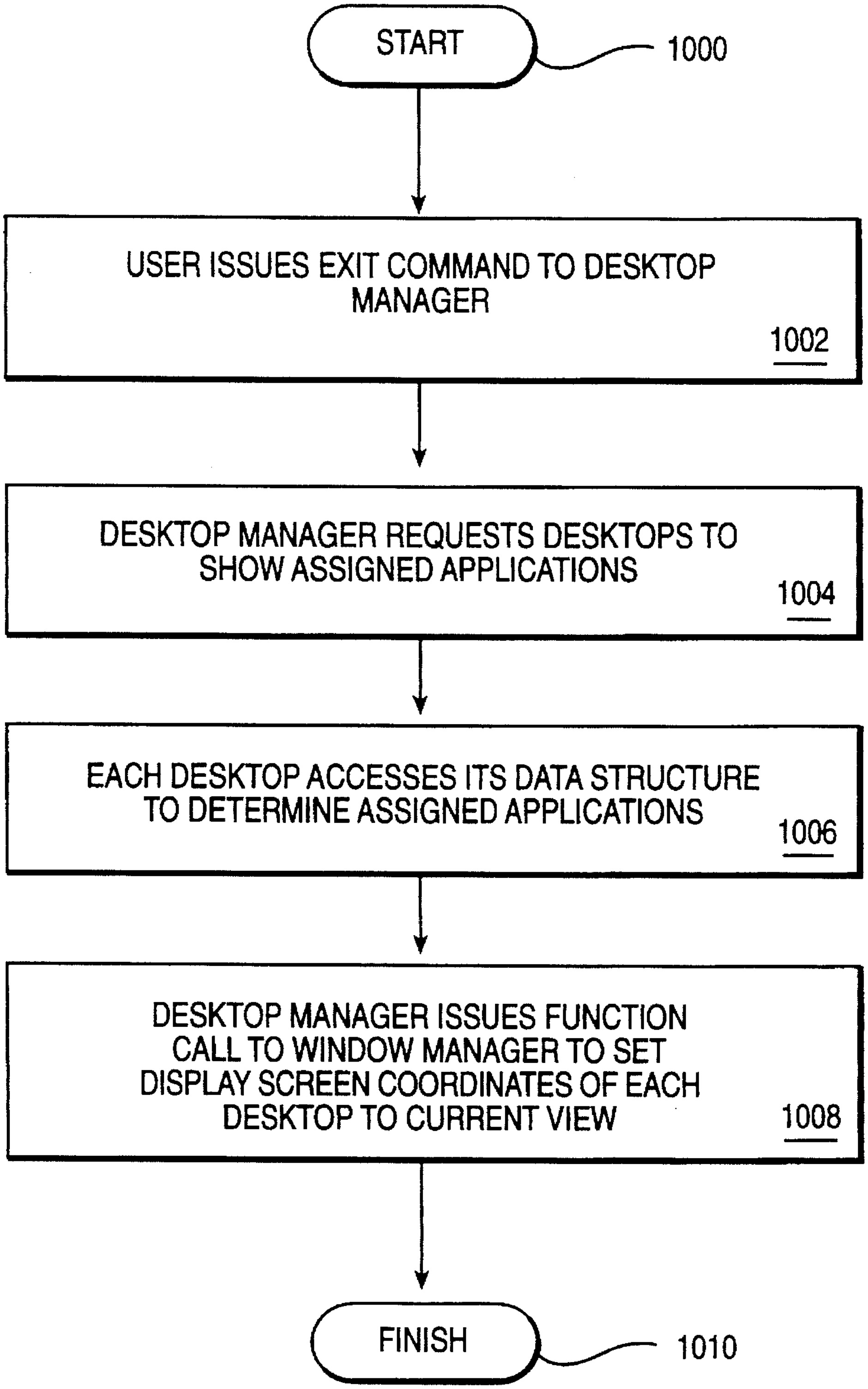
FIG. 10 is a flowchart illustrating the sequence of steps for exiting the virtual desktop system of the invention.

Lastly, the flowchart of FIG. 10 illustrates the sequence of steps used to exit the virtual desktop system in a manner which ensures that all open applications are closed prior to exiting the programs of the system. This routine is particularly advantageous for open application windows running in the background of the desktop environment and hidden from the user when exiting the system.

The routine starts in Step 1000 and proceeds to Step 1002 where the user issues a command to the Desktop Manager to exit the virtual display system. This may be accomplished by selecting an exit command from the menus of the Desktop Manager interface. In Step 1004, the Desktop Manager issues <ShowView> function call messages to the Desktops requesting them to show their assigned applications. In Step 1006, each Desktop accesses its data structure to determine which applications are assigned to it and returns the requested information to the Desktop Manager. In Step 1008, the Desktop Manager issues <SetWindowPos> function call messages to the window manager to set the display screen coordinates of each Desktop to the current view in accordance with the obtained information and the routine finishes in Step 1010.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for organizing a plurality of open applications executing on a computer having a display screen, each of said plurality of open applications generating a screen image at assigned image coordinates, said display screen having a predetermined coordinate range representing a current visible view, said method comprising the steps of:

assigning a desktop range of display screen coordinates outside of said predetermined coordinate range to each of a plurality of desktop display areas;

assigning image coordinates within one of said desktop ranges to each of a plurality of screen images generated by a collection of said open applications so that said collection of open applications are assigned to one desktop display area, but are not visible; and changing said image coordinates of each of said plurality of screen images by a fixed amount to place said image coordinates within said predetermined coordinate range of said current visible view to move said plurality of screen images generated by said collection of open applications as a group to said current visible view while maintaining relative positions between screen images.

2. The method of claim 1 further comprising the step of storing a list of open applications in said collection in a data structure associated with said one desktop display area.

3. The method of claim 2 further comprising the step of storing a list of said desktop display areas and their assigned display screen coordinates in a data structure associated with a desktop manager program.

4. The method of claim 3 further comprising the step of accessing said data structures to determine assigned open applications for each desktop display area.

5. The method of claim 1 wherein the step of assigning further comprises assigning a desktop range of display screen coordinates to each of said desktop display areas, the desktop range having a size at least twice a size of the predetermined coordinate range of the current view.

6. The method of claim 5 wherein each of the plurality of screen images is displayed in an application window and the step of setting comprises the step of moving each of said application windows to the predetermined coordinate range of the current view.

7. A virtual desktop system for organizing a plurality of open applications executing on a computer having a display screen and a memory, each of said plurality of open applications generating a screen image at assigned image coordinates, said display screen having a predetermined coordinate range representing a current visible view, said virtual desktop system comprising:

a plurality of desktop display areas stored in the memory, each desktop display area comprising a range of display screen coordinates outside of said predetermined coordinate range;

means for assigning image coordinates within one of said desktop ranges to each of a plurality of screen images generated by a collection of said open applications related by function so that said plurality of screen images are assigned to one of said desktop display areas, but are not visible; and means for switching between said plurality of desktop display areas stored in said memory by resetting image coordinates of each of said plurality of screen images by a fixed amount to place said screen images within said predetermined coordinate range so as to move said plurality of screen images generated by said collection of said open applications into said current view while maintaining relative positions between said images.

8. The virtual desktop system of claim 7 further comprising means comprises a desktop manager for assigning a range of display screen coordinates to each of said desktop display areas.

9. The virtual desktop system of claim 8 wherein said desktop manager comprises means for assigning coordinates to each of said plurality of screen images corresponding to said open applications.

10. The virtual desktop system of claim 9 wherein said switching means further comprises a window manager for displaying each of said plurality of screen images in an application window.

11. The virtual desktop system of claim 10 wherein said window manager comprises means for moving each of said application windows to the predetermined coordinate range of the current view.

12. A computer having a virtual desktop system for organizing a plurality of open application programs stored in a memory of said computer for display on a display screen having a predetermined coordinate range representing a current visible view, each of said plurality of open applications generating a screen image at image coordinates, said computer comprising:

a processor for executing said open application programs stored in said memory;

an operating system cooperating with said processor to execute said open applications and to control said display screen;

a window manager program of said operating system, said window manager drawing application windows, each application window holding a screen image generated by one of said open applications;

a plurality of desktop display areas, each comprising a collection of said open application programs executed by said processor and a coordinate range within which application windows are drawn to hold screen images generated by said collection of said open application programs; and a desktop manager program for managing display of said application windows by switching between said desktop display areas by changing a coordinate range of a selected desktop area to lie within said predetermined coordinate range to display application windows in said selected desktop display area on the screen with relative positions between said application windows unchanged.

13. The computer of claim 12 wherein said desktop manager comprises means for assigning a range of display screen coordinates to each of said desktop display areas.

14. The computer of claim 13 further comprising means for exchanging messages between said window manager, said desktop manager and said desktop display areas to display said application windows of said collection of open application programs in said selected desktop display area on the screen.

15. The computer of claim 14 wherein said messages include function calls for setting said range of display screen coordinates of said selected desktop display area to the predetermined coordinate range of the current view.

16. A computer program product for use with a computer system having a memory, a display screen and a window manager program, said computer program product comprising:

a computer usable medium having computer readable program code means embodied in said medium for organizing a plurality of open applications, that are executing on the computer system, so that screen images generated by said applications can be selectively displayed on said display screen by said window manager program, said display screen having a predetermined coordinate range representing a current visible view, said computer readable program code comprising:

means for assigning a range of display screen coordinates outside of said predetermined coordinate range to each of a plurality of desktop display areas;

means for placing a collection of open applications into one of said plurality of desktop display areas by causing said window manager program to draw screen images generated by each of said collection of open applications at display screen coordinates within said display screen coordinate range assigned to said one desktop display area so that said screen images generated by each of said collection of open applications are not visible; and means selectively displaying said screen images generated by each of said collection of open applications by changing said display screen coordinates of said display screen coordinate range assigned to said one desktop display area by a fixed amount so that said screen images are placed within said predetermined coordinate range of said current view while maintaining their positions relative to each other.

17. The computer program product as defined in claim 16, wherein said computer readable program code further comprises means for causing said computer system to store in said memory, a list of open applications in said collection in a data structure associated with said one desktop display area.

18. The computer program product according to claim 16 wherein the assigning means further comprises a means for assigning a range of display screen coordinates to each of the desktop display areas that spans a range of coordinates that is at least twice the predetermined coordinate range of the current view.

* * * * *